(12) United States Patent
Ekin

(10) Patent No.: US 10,946,793 B1
(45) Date of Patent: Mar. 16, 2021

(54) THREAT DETECTION AND MITIGATION APPARATUS AND USE THEREOF

(71) Applicant: EKIN TEKNOLOJI SANAYI VE TICARET A.S., Istanbul (TR)

(72) Inventor: Akif Ekin, Istanbul (TR)

(73) Assignee: EKIN TEKNOLOJI SANAYI VE TICARET ANONIM SIRKETI, Istanbul (TR)

( * ) Notice: Subject to any disclaimer, the term of this patent is extended or adjusted under 35 U.S.C. 154(b) by 0 days.

(21) Appl. No.: 16/840,474

(22) Filed: Apr. 6, 2020

(51) Int. Cl.
| | |
|---|---|
| B60Q 1/26 | (2006.01) |
| G06K 9/00 | (2006.01) |
| B60Q 1/52 | (2006.01) |
| G08G 1/01 | (2006.01) |
| G08G 1/052 | (2006.01) |

(52) U.S. Cl.
CPC ............ B60Q 1/2611 (2013.01); B60Q 1/52 (2013.01); G06K 9/00288 (2013.01); G06K 9/00825 (2013.01); G08G 1/0104 (2013.01); G08G 1/052 (2013.01)

(58) Field of Classification Search
CPC .................................................. G06K 9/325
See application file for complete search history.

(56) References Cited

U.S. PATENT DOCUMENTS

| | | | |
|---|---|---|---|
| 9,791,766 B2 | 10/2017 | Ekin | |
| 9,928,737 B2 | 3/2018 | Ekin | |
| 9,946,734 B2 | 4/2018 | Ekin | |
| 10,692,304 B1* | 6/2020 | Deyaf | H04W 4/44 |
| 2012/0308971 A1* | 12/2012 | Shin | G08B 31/00 434/236 |
| 2014/0195105 A1* | 7/2014 | Lambert | G07C 5/08 701/33.4 |
| 2016/0132743 A1* | 5/2016 | Ekin | G03B 17/02 382/105 |
| 2019/0378363 A1* | 12/2019 | Becker | G07C 5/0841 |

* cited by examiner

*Primary Examiner* — Nabil H Syed
*Assistant Examiner* — Cal J Eustaquio
(74) *Attorney, Agent, or Firm* — Bayramoglu Law Offices LLC

(57) ABSTRACT

A vehicle mounted apparatus adapted to assess a threat level of a suspect and to guide a police officer in responding to the suspect and having a CPU, a plurality of sensors, and an output device. The sensors include vision, sound, proximity, speed, and Xray vision sensors. The apparatus is adapted to "read" a vehicle's license plate, perform Xray scanning of a vehicle's inner compartments, and to perform facial recognition and weapons detection. The apparatus is adapted to combine sensed data with known data of suspects and risks to "intelligently" output a threat/risk assessment. The apparatus may automatically inform a central monitoring station of the threat/risk assessment and automatically send an appropriate level of police backup. The apparatus is preferably adapted to automatically monitor proximate moving vehicles during a police stop, and upon detecting a speeding vehicle, to automatically respond with an appropriate level of response.

13 Claims, 3 Drawing Sheets

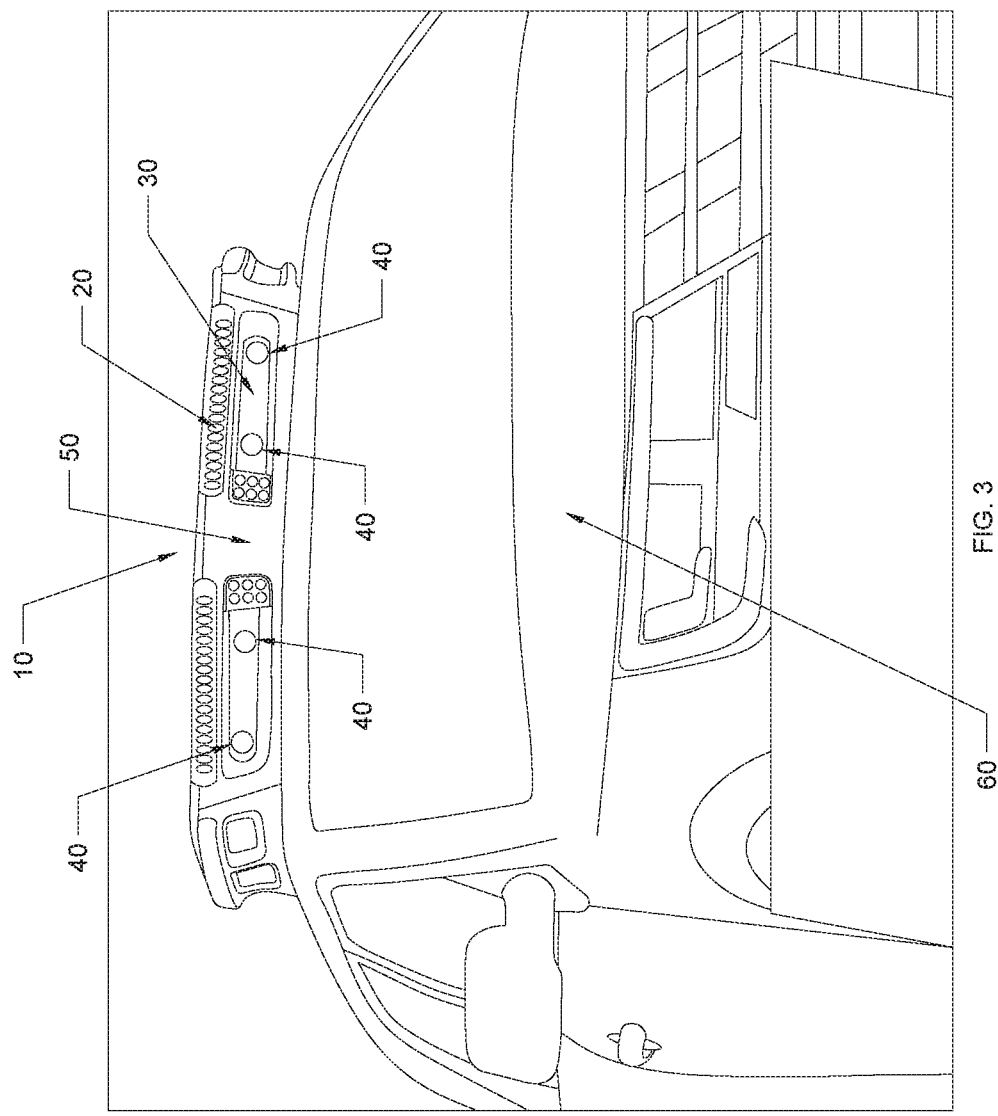

THREAT DETECTION AND MITIGATION APPARATUS AND USE THEREOF

FIELD OF THE INVENTION

The present invention relates to threat detection and mitigation apparatuses, and more especially to automatic danger detection and mitigation apparatuses that may be used by police in monitoring and assessing potentially dangerous person and dangerous approaching cars encountered during traffic stops, and reducing the potential danger by providing information therefor.

BACKGROUND OF THE INVENTION

During the course of conventional police work, a police officer may encounter various suspicious persons require further investigate (i.e. who need to be "pulled over" and potentially searched) for a plurality of reasons such as, speeding, reckless driving, driving while intoxicated (DWI or Driving While under the Influence), theft, robbery, assault, weapons violation, unlicensed/expired license vehicle, stolen vehicle, etc. However, in the current state of the art, expect for in unusual circumstance wherein the police officer may have specific foreknowledge of the suspect, the police officer is left to guess, guided by experience and/or instinct, as to which suspect may be benign versus which suspect may pose a high risk danger (e.g. the suspect may be a rather benign elderly person who was unaware of the speed of their driving vs a hardened criminal with a known violent criminal history). Moreover, during such traffic stops, while attempting to assess the potential danger so as to respond with the appropriate level of preparation, caution and forcefulness, the police officer may also have to deal with heavy traffic and vehicles that are speeding in near proximity to the police officer and his stopped vehicle. Some portable scanning and monitoring devices are known in the art. Examples of such portable scanning and monitoring devices are disclosed for instance in U.S. Pat. Nos. 9,791,766, 9,928,737, and 9,946,734 all to Ekin and are expressly incorporated herein in their entirety by reference.

SUMMARY

In order to cost-effectively solve the problem danger to police officers as disclosed above, the present invention is a system or apparatus adapted to assess a threat level of a potential suspect and to guide a police officer in encountering and/or dealing with the suspect. The apparatus preferably comprises a retrofittable self-contained police light bar having hardware required for the functional of the apparatus conveniently "plug and play" (see: https://en.wikipedia.org/wiki/Plug_and_play) retrofittably contained therein. In an exemplary embodiment, the apparatus comprises a vehicle mounted/integrated apparatus having a CPU (Central processing Unit—preferably having a GPS/GNSS (see: https://www.gsa.europa.eu/european-gnss/what-gnss) or similar Satellite Positioning System, digital storage having executables instructions or "software" stored thereon, LTE, Wi-Fi, and Bluetooth and "all needed accessories"), a plurality of sensors and scanners, an electrical plug device, and an output device (e.g. a video screen, wireless remote alerting system and/or speakers) all housed within a retrofittable police light bar (see: https://ekin.com/en/products/ekin-patrol-g2). For a conventional police light bar see: https://en.wikipedia.org/wiki/Emergency_vehicle_lighting. The electrical plug device is adapted to plug into a vehicle's auxiliary power outlet (see: https://en.wikipedia.org/wiki/Automobile_auxiliary_power_outlet) so as to provide electrical power to the apparatus and to provide actuatable communication to vehicle devices such as lights, horns, etc. In an alternate embodiment, that apparatus does not include an electrical plug device but does include at least one battery and is adapted to connect wirelessly to various devices if/as needed such as via a Bluetooth connection (see: https://en.wikipedia.org/wiki/Bluetooth). The apparatus may also wirelessly connect to one or more other devices such as a police officer's cellular phone. The sensors/scanners preferably include vision sensors (e.g. see: https://en.wikipedia.org/wiki/Machine_vision), proximity detection sensors (e.g. see: https://en.wikipedia.org/wiki/Proximity_sensor), speed detection sensors (e.g. doppler radar, see: https://en.wikipedia.org/wiki/Doppler_radar), and Xray vision sensors (see: https://security.adanisystems.com/products/adani-vehicle-screening/). The apparatus is adapted so as to "read" a vehicle's license plate via ALPR or Automatic License Plate Recognition (see: https://www.pcmag.com/encyclopedia/term/alpr) which is also referred to as ANPR or Automatic Number-Plate Recognition (see: https://en.wikipedia.org/wiki/Automatic_number-plate_recognition), perform Xray or like scanning of a vehicle's inner compartments such as a vehicle trunk, and to perform facial recognition (see: https://en.wikipedia.org/wiki/Facial_recognition_system) and weapons detection. The apparatus is further adapted so as to combine the sensed data with a known database of suspects (such as wirelessly connecting to a central or main database of known suspect profiles) and known risks (such as wirelessly connecting to a central or main database of known weapons), and then to "intelligently" output a threat/risk assessment such as an audible or visual (or both) assessment so as to the guide the police officer in responding to the situation with the appropriate level of preparation, caution and forcefulness.

The apparatus may also be adapted so as to automatically inform a central monitoring station of the threat/risk assessment that the police officer is facing so as to automatically send an appropriate level of police backup if/as necessary. The apparatus is further preferably adapted so as to automatically monitor proximate dangerously close approaching vehicles, especially proximate moving vehicles, that may be speeding in near proximity to the police officer and/or the police officer's vehicle, and upon detecting a proximate speeding vehicle, to automatically respond with an appropriate level of response depending on a level of moving violation (e.g. if a proximate vehicle is speeding but only in the amount of 5 mph or less over the prevailing speed limit, the apparatus may respond with a mild audio or visual warning, but if a proximate vehicle is speeding but only in excess of 5 mph over the prevailing speed limit, the apparatus may respond with an aggressive audio or visual warning—brightly flashing emergency lights and/or loud sirens or machine language warnings—and/or an automatic recording of the incident and/or the automatic sending of a moving violation ticket (a traffic ticket).

DETAILED DESCRIPTION OF EMBODIMENTS

Figure 1:
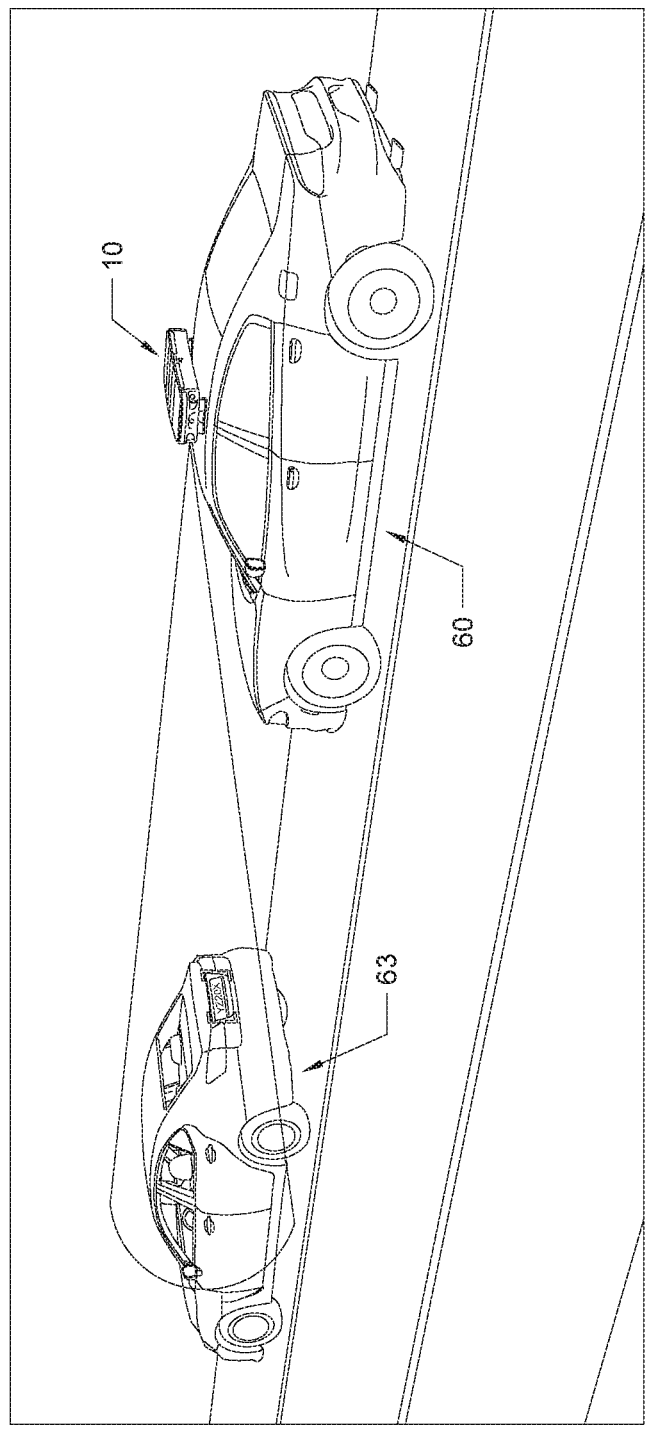
FIG. 1 shows a perspective view of an embodiment of the present invention in which a police vehicle having the invention mounted thereon has "pulled over" a civilian vehicle.
Figure 2:
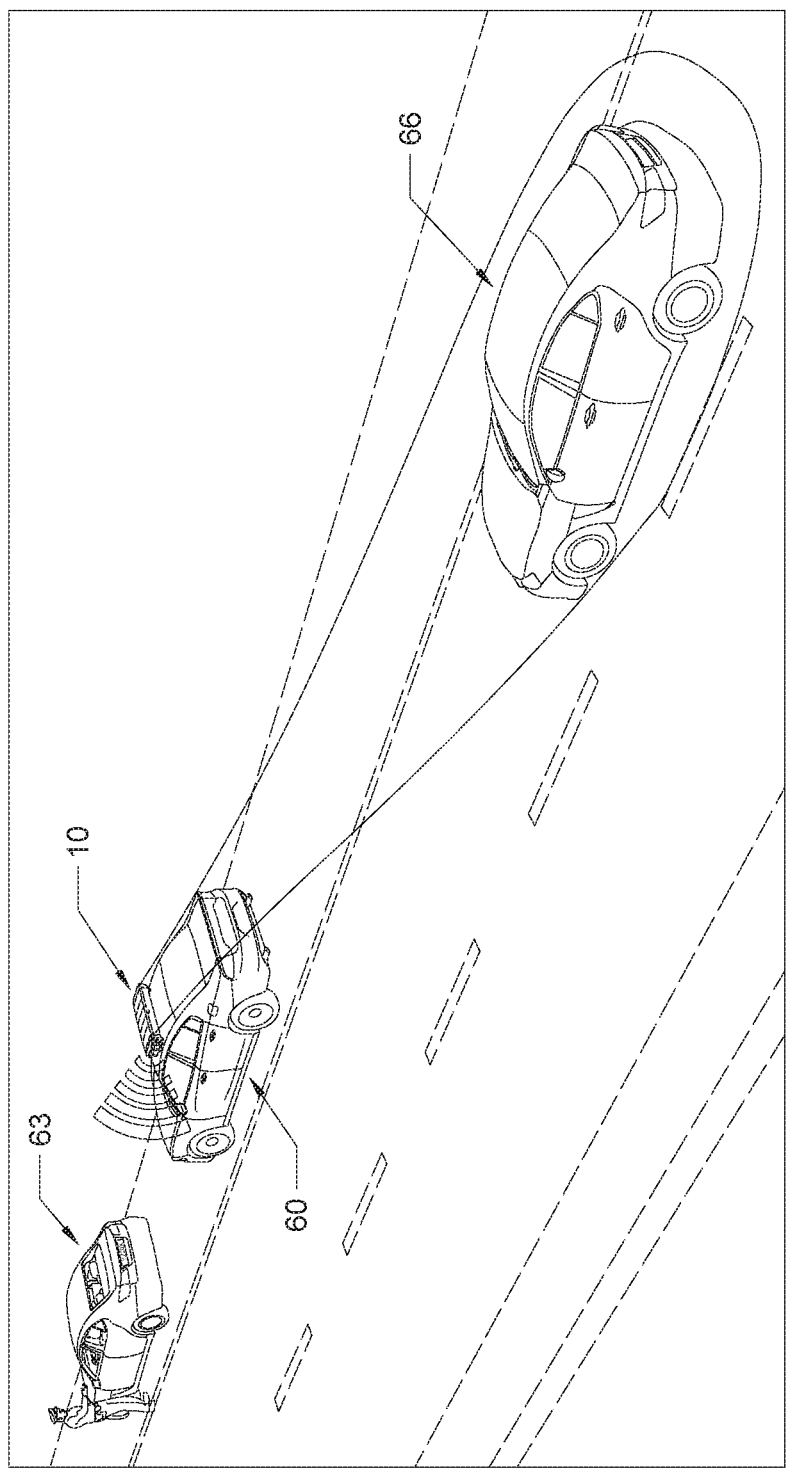
FIG. 2 shows a perspective view of an embodiment of the present invention in which a police vehicle having the invention mounted thereon has "pulled over" a civilian vehicle and in which a dangerous speeding vehicle has been detected; and, FIG. 3 shows a perspective view of an embodiment of the modular adaptable police light bar of the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are included to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

In order to facilitate the understanding of the present invention in reviewing the drawings accompanying the specification, a feature table is provided below. It is noted that like features are like numbered throughout all of the figures.

FEATURE TABLE

| # | Feature |
|---|---|
| 10 | Light bar |
| 20 | Light |
| 30 | CPU |
| 40 | Sensor |
| 50 | Output device |
| 60 | Police vehicle |
| 63 | Stopped civilian vehicle |
| 66 | Dangerous speeding vehicle |

Referring now to the drawings, in a preferred embodiment the invention is a threat detection and mitigation apparatus integrated into a module portable police light bar and method of use thereof comprising a portable modular vehicle mountable light bar 10 having a light 20, a CPU 30, a plurality of sensors 40, and at least one output device 50 preferably in the form of a video screen and/or speakers. Light bar 10 is adapted to be modularly and retrofittably mounted to a police vehicle 60 effectively converting a conventional police vehicle into a "smart" police vehicle. Light bar 10 is preferably wirelessly connected to one or more other devices such as a police officer's cellular phone. Sensors 40 preferably include vision sensors, proximity detection sensors, speed detection sensors, and Xray vision sensors. Sensors 40 and output device 50 are in electronic communication with the CPU 30. Light bar 10 is adapted so as to "read" a vehicle's license plate via ALPR, perform Xray or like scanning of a vehicle's inner compartments such as a vehicle trunk, to perform facial recognition of a suspect, and to perform weapons detection (e.g. whether openly carried or concealed on a suspect or inside of a vehicle compartment). The apparatus is further adapted so as to combine the sensed data (.e.g. which itself may have been combined via sensor fusion, see: https://en.wikipedia.org/wiki/Sensor_fusion), and with a known database of suspects (such as wirelessly connecting to a central or main database of known suspect profiles) and known risks (such as wirelessly connecting to a central or main database of known weapons), and then based on the input "intelligently" outputting a threat/risk assessment such as an audible or visual (or both) assessment so as to the guide the police officer in responding to the situation with the appropriate level of preparation, caution and forcefulness. Light bar 10 may also be adapted so as to automatically inform a central monitoring station of the threat/risk assessment that the police officer is facing so as to automatically send an appropriate level of police backup if/as necessary. Light bar 10 is further preferably adapted so as to automatically monitor proximate vehicles, especially proximate moving vehicles, that may be speeding in near proximity to the police officer and/or the police officer's vehicle, and upon detecting a proximate speeding vehicle, to automatically respond with an appropriate level of response depending on a level of moving violation (e.g. if a proximate vehicle is speeding but only in the amount of 5 mph or less over the prevailing speed limit, the apparatus may respond with a mild audio or visual warning, but if a proximate vehicle is speeding in excess of 5 mph over the prevailing speed limit, the apparatus may respond with an aggressive audio or visual warning—brightly flashing emergency lights and/or loud sirens or machine language warnings—and/or an automatic recording of the incident and/or the automatic sending of a moving violation ticket (a traffic ticket).

Thus in practice a first operational scenario is as follows: The apparatus is mounted/integrated into a police vehicle and is active. A police officer using the vehicle encounters a vehicle committing a moving violation by virtue of traveling at 4 mph over the posted speed limit or the ALPR system has detected a suspicious or wanted license plate or any other suspicious behavior. There is no detected proximate traffic (e.g. there are no other vehicles traveling in the area of the "pull-over"). By virtue of a first (vehicle mounted) emergency light signaling and an audible command over a vehicle mounted PA (public Address) system, the police officer commands the vehicle to "pull over" (i.e. pull over to the side of the road and stop). In addition to recording the detected vehicle speed and time of speeding occurrence, as the vehicle is pulling over, the apparatus scans the vehicle license plates and detects that the vehicle is not stolen and that the vehicle owner has no outstanding warrants or any history of law violations, and scans the vehicle inner compartments and detects the absence of any weapons or any illegal substances/contraband. As the apparatus observes the vehicle operator (the suspect), the apparatus performs a facial recognition and accesses the suspect's history which include no prior violations of any kind, and indicates the suspects vital information (including name, age, gender, height, weight, home address, etc.). Before the officer would otherwise have exited the police vehicle, the apparatus provides the police officer a threat/risk assessment which indicates a low (e.g. 1 out of 10) threat/risk assessment and provides a summary of the suspect. The police officer, in an unthreatening manner and with his service weapon holstered, approaches calmly approaches the suspect vehicle and issues the suspect a friendly warning to abide by the posted speed limit.

Thus in practice a second operational scenario is as follows: The apparatus is mounted/integrated into a police vehicle and is active. A police officer using the vehicle encounters a vehicle committing a moving violation by virtue of traveling at 10 mph over the posted speed limit. There is heavy detected proximate traffic (e.g. there are many other vehicles traveling in the area of the "pull-over"). By virtue of a first (vehicle mounted) emergency light signaling and an audible command over a vehicle mounted PA (public Address) system, the police officer commands the vehicle to "pull over" (i.e. pull over to the side of the road and stop) and the apparatus initiates a warning via flashing lights and audible warnings to vehicles/operators traveling proximate to the police vehicle and automatically records the speed, time of occurrence, and facial image of two proximate speeding vehicle operators and automatically initiates the sending of "speeding tickets" to the operators thereof. In addition to also recording the detected vehicle speed and time of speeding occurrence, as the vehicle is pulling over, the apparatus scans the vehicle license plates and detects that the vehicle is stolen, by virtue of facial recognition determines that vehicle operator has a revoked driver's license and has outstanding felony warrants with a history of law violations and violent altercations, and scans the vehicle inner compartments and detects the presence of both weapons and illegal substances/contraband. As the apparatus has observed the vehicle operator (the suspect), the has accessed the suspect's history which includes the prior violations, and indicates the suspects vital information (including name, age, gender, height, weight, home address, etc.). The police officer commands the suspect to remain in the vehicle and while the apparatus is also conveying the detected information to a central station and summons police backup. The apparatus informs the police office of the estimated time of arrival of the police backup and the officer remains vigilant with weapon drawn as he waits for police backup. Upon arrival of police backup, the police officer commands the suspect to exit the vehicle and the police officer proceeds to safely arrest the suspect without injury or incident.

In a preferred embodiment, light bar 10 is adapted to provide sensing coverage at locations not covered by sensing cover by a fixed system. Light bar 10 is further preferably adapted to simultaneously monitor up to seven lanes of traffic for both plate recognition, speed detection and enforcement. Light bar 10 is further preferably adapted to provide a full 360 field of plate recognition, speed detection and speed enforcement. Light bar 10 is further preferably adapted to optionally integrate with a body-worn camera and to have gunshot and pollution sensing integration.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A threat detection and mitigation apparatus for use in retrofittingly mounting to a police vehicle, comprising a portable police light bar having a computer processing unit, a plurality of sensors, at least one light and at least one output device integrated therein, wherein the apparatus is adapted to survey a circumstance and to provide a threat assessment thereof, and
when a proximate vehicle is speeding in an amount of 5 mph or less over a prevailing speed limit, the apparatus responds with a mild audio or visual warning and when the proximate vehicle is speeding in excess of 5 mph over the prevailing speed limit, the apparatus responds with an aggressive audio or visual warning.

2. The apparatus of claim 1, wherein the survey of the circumstance further comprises at least one of a survey of at least seven lanes of traffic simultaneously, a 360-degree survey, and a combination thereof.

3. The apparatus of claim 1, wherein the apparatus is wirelessly removably mounted to a police vehicle.

4. The apparatus of claim 1, wherein the plurality of sensors comprises at least one of a vision sensor, a sound sensor, a proximity sensor, a speed sensor, an Xray sensor, and a combination thereof, and wherein the at least one output device comprises at least one of a video screen, speakers, a combination of a video screen and speakers, and an original equipment vehicle mounted device comprising at least one of a horn, a siren, a screen, and a speaker electrically connected thereto.

5. The apparatus of claim 1, wherein the survey of the circumstance further comprises performing at least one of automatic license plate recognition (ALPR), facial recognition, and ALPR and facial recognition.

6. The apparatus of claim 1, wherein the threat assessment is rendered by comparing at least one of an ALPR image, a facial recognition image, and both an ALPR image and a facial recognition image with a database of known risk images.

7. The apparatus of claim 1, wherein when at least one of an ALPR image, a facial recognition image, and both an ALPR image and a facial recognition image match an image in a database of known risk images to within a predetermined match degree, the threat assessment indicates a threat that corresponds to the matched image.

8. The apparatus of claim 1, wherein the apparatus automatically monitors traffic in proximity to the apparatus and automatically provides the response when the proximate vehicle violates at least one rule.

9. A threat detection and mitigation apparatus wirelessly removably mounted to a police vehicle comprising a portable police light bar having a CPU, a plurality of sensors, at least one light and at least one output device integrated therein, wherein the apparatus is adapted to survey a circumstance and to provide a threat assessment thereof,
when a proximate vehicle is speeding in an amount of 5 mph or less over a prevailing speed limit, the apparatus responds with a mild audio or visual warning and when the proximate vehicle is speeding in excess of 5 mph over the prevailing speed limit, the apparatus responds with an aggressive audio or visual warning and
wherein the survey of the circumstance further comprises at least one of a survey of at least seven lanes of traffic simultaneously, a 360-degree survey, and a combination thereof.

10. The apparatus of claim 9, wherein the plurality of sensors comprises at least one of a vision sensor, a sound sensor, a proximity sensor, a speed sensor, an Xray sensor, and a combination thereof, and wherein the at least one output device comprises at a video screen and speakers, and wherein the survey of the circumstance further comprises performing at least one of ALPR, facial recognition, and ALPR and facial recognition.

11. The apparatus of claim 9, wherein the threat assessment is rendered by comparing at least one of an ALPR image, a facial recognition image, and both an ALPR image and a facial recognition image with a database of known risk images.

12. The apparatus of claim 9, wherein when at least one of an ALPR image, a facial recognition image, and both an ALPR image and a facial recognition image match an image in a database of known risk images to within a predetermined match degree, the threat assessment indicates a threat that corresponds to the matched image.

13. The apparatus of claim 9, wherein the apparatus automatically monitors traffic in proximity to the apparatus and automatically provides the response when the proximate vehicle violates at least one rule.

\* \* \* \* \*